Patented Nov. 2, 1948

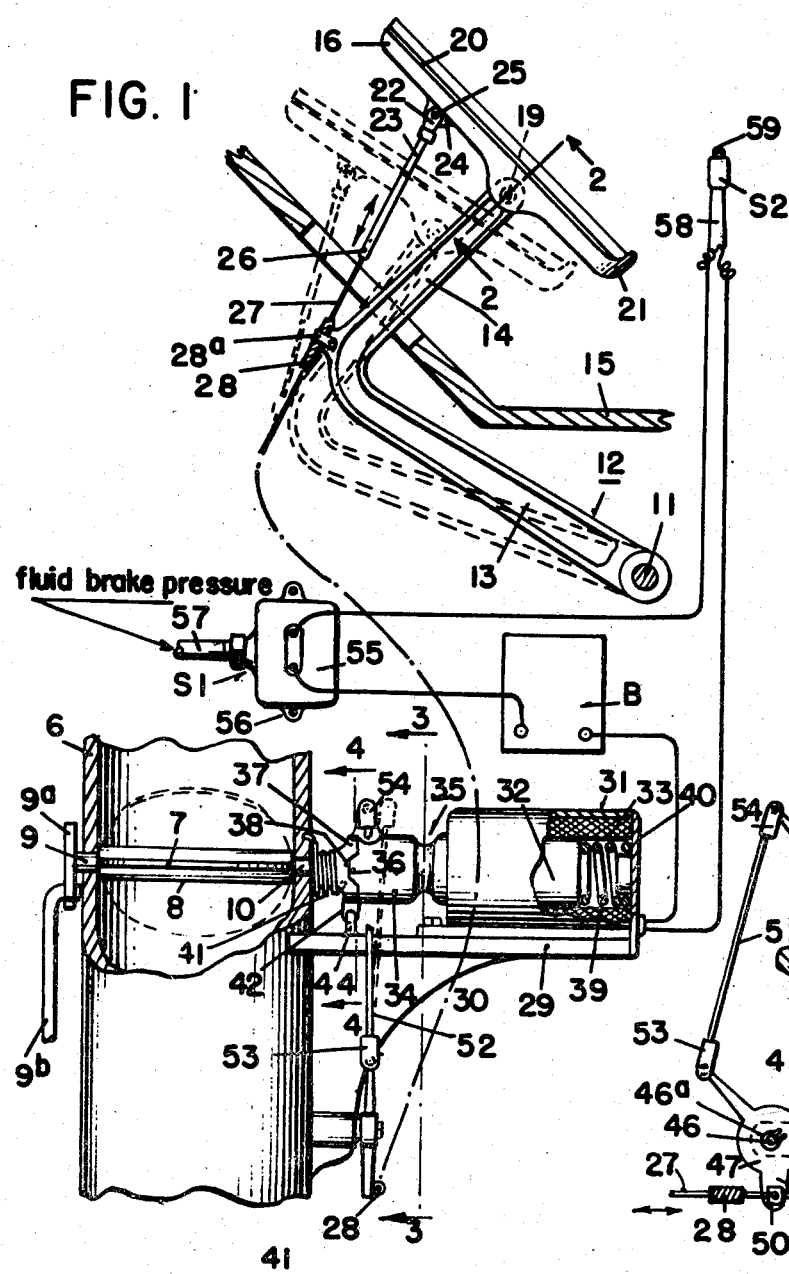

2,453,054

UNITED STATES PATENT OFFICE 2,453,054

COMBINATION BRAKE PEDAL AND THROTTLE

Richard Eldridge Whiffen, Hammonton, N. J.

Application July 18, 1947, Serial No. 761,824

7 Claims. (Cl. 192—3)

This invention relates to apparatus for the control of motor vehicles, and more particularly to a device for the operation of the throttle and brakes of a motor vehicle.

In the operation of a motor vehicle it is often necessary to make quick stops. With the usual arrangement of separate controls for throttle and brakes the driver must go through the process of first removing his foot from the throttle control and then moving it over to the brake pedal for application of the brakes. This movement requires merely a fraction of a second but at high rates of speed the vehicle will travel a relatively great distance. Obviously the ease of operation and margin of safety will be increased if these controls are combined into a single device which will enable a driver to change from the application of power to the application of braking force without any delay, other than that resulting from the normal human reflexes.

It is my purpose to accomplish this result by the use of a foot pedal suitably mounted for translational and rotational or pivotal movement. When the pedal is rotated or tilted, it will control the throttle setting and thus the amount of power supplied by the engine of a motor vehicle. The engine may be of the conventional internal combustion type, and for purposes of illustration I have shown my device operating the throttle valve placed in the intake manifold of such an engine. However, the device would work equally well with vehicles powered by Diesel engines or electric motors. When the pedal is given movement in translation it serves to operate the braking mechanism, which may be of any conventional construction.

There is also provided a clutch means by which the throttle may be disconnected from the foot pedal as soon as the braking operation begins. At the same time a spring operates to close the throttle to idle position, so that even if the operator of the car does not depress the clutch pedal to disconnect the engine from the transmission, the application of power to the wheels of the vehicle is cut off as soon as the braking operation begins.

Furthermore, provision has been made for the situation which arises when the brakes have been applied while the vehicle is proceeding up an incline. When it is desired to start the vehicle again it is necessary to maintain a certain amount of braking power to keep the vehicle from rolling backward, and at the same time apply power to the wheels to start the vehicle. In my invention a manually operated means is provided to re-connect the foot pedal and the throttle so that power may be applied simultaneously with an application of braking force.

Therefore it is an object of my invention to provide a single control for the operation of the throttle and braking mechanism of a motor vehicle.

Another object of my invention is to provide a single control means for the operation of the throttle and braking mechanism of a motor vehicle in which the throttle will be closed as soon as the application of braking force begins.

Still another object of my invention is to provide a single control for the operation of the throttle and braking mechanism of a motor vehicle in which power may be applied, if desired, simultaneously with the application of braking force.

Other objects of the invention will appear from the following description and accompanying drawing, and will be pointed out in the following claims.

The invention is hereinafter more fully described and is illustrated in the accompanying drawing, in which:

Figure 1 is a diagrammatic view, partly in section, showing the arrangement of the various parts, and their relation to each other;

Figure 2 is a cross-sectional view of the foot pedal and brake lever taken on the line 2—2 of Figure 1;

Figure 3 is a cross-sectional view taken on line 3—3 of Figure 1;

Figure 4 is a cross-sectional view taken on line 4—4 of Figure 1; and

Figure 5 is a schematic wiring diagram of the electrical connections.

Now referring to the drawing in detail, the power controlling portion of an engine for a motor vehicle is represented in Fig. 1 by the intake manifold identified by the reference numeral 6. Within the manifold is a throttle valve 7, mounted on a shaft 8, which rotates on bearings 9 and 10 so as to control the flow of fuel vapor through the intake manifold in the usual manner. The valve 7 is shown in its closed position by the solid lines; while the dotted lines show its position when partially open.

The mechanism, other than the foot brake pedal, for applying braking force to the wheels of a vehicle is not shown, but it will be understood that the actual system used forms no part of the invention, and is not limited to any particular type. The brakes may be operated by a mechanical, hydraulic, or electrical system, and may be controlled by the rotation of a suitably mounted shaft identified by the reference numeral 11 in Fig. 1. Rotation of this shaft is accomplished by means of the brake lever 12, which is roughly L-shaped. One arm 13 of the brake lever is fixed to the shaft 11, while the other arm 14 extends upwardly through a suitable opening provided in the floorboard 15 of the vehicle. Operation of the brake lever 12 is accomplished by the foot pedal 16 which is pivotally attached to the arm 14 of the brake lever as shown in detail in Fig. 2. A downwardly extending lug 17 is attached at about the midpoint of the back of foot pedal 16. The upper end of arm 14 is provided with two ears 18 to form a yoke for the reception of the lug 17. The ears 18 and the lug 17 are provided with holes for the reception of the pin 19. The pin 19 is securely held in any conventional manner by the ears 18, while the lug 17 is free to rotate. In order to minimize the possibility of the driver's foot slipping, a cap 20 of molded rubber or soft, non-slippery plastic is fitted over the pedal 16 or may be bonded to it by conventional methods. The cap is formed with a roughened surface as shown in Fig. 2 and is also provided with a raised edge 21 which extends around the lower edge and one side of the cap, serving as a heel, and sole rest.

At a point above the lug 17, on the under side of the pedal 16, there is provided another lug 22. The stiff rod 23 has one end fitted with a yoke 24 similar to the yoke 18 but somewhat smaller. The lug 22 has a hole, not shown, extending horizontally therethrough. A pin 25 extends through both sides of the ears of the yoke 24 and through the opening in the lug 22 and is held by any suitable means against dislodgment. The rod 23 is thus free in rotation but is restricted in translation. The other end 26 of the rod 23 is adjustably secured in any appropriate manner to a motion transmitting device, which in the disclosure is the core 27 of a Bowden wire which slides within the flexible casing 28 attached to the brake lever 12 by a clamp 28ᵃ.

The motion transmitting device is connected, in a manner to be later disclosed, by a clutch means 35 to the power controlling device which in this case is the throttle valve 7. In this fashion the rotational movement of the pedal 16 about the axis of the pin 19 will operate the throttle valve 7. At the same time, a translational movement of the pedal 16 will cause the brake lever 12 to be depressed and will operate the brake actuating mechanism through the shaft 11.

Projecting outwardly from the side of the intake manifold 6 is a shelf 29, braced on its under side by a web 30. Attached to the shelf is an electrical solenoid 31 provided with a slidable core 32, which is also somewhat rotatable. The inner surface of the solenoid winding 33 forms a sleeve within which is housed the core 32, which may have movement endwise and somewhat rotatably, as will be explained. The solenoid is positioned so that axis of rotation of the core 32 is concentric with the axis of rotation of the throttle valve 7. The projecting end 34 of the core 32 is provided with a radially extending rib 36. Attached to the projecting portion of the shaft 8 of the throttle valve 7 is a circular plate 37, provided with a radially extending slot 38. A spring 39 abuts against the inner wall 40 of the solenoid and urges the core 32 longitudinally so that normally the projecting end 34 of the core 32 abuts against the circular plate 37 as shown by the solid lines in Fig. 1. In this position the rib 36 will engage the slot 38, preventing relative rotation of shaft 8 and the core 32. In order to facilitate engagement of the rib 36 and slot 38, their sides are slightly beveled. The length of the core 32 is determined so that when the solenoid winding 31 is energized, as will be later explained, the core 32 will be withdrawn against the opposition of the spring 39 and the rib 36 will disengage the slot 38, as shown by the dotted lines in Fig. 1. The portion 34 of the core, and the rib 36 constitute the driving element of the clutch means 35, while the circular plate 37 and the slot 38 constitute the driven element of clutch means 35. A coil spring 41, one end of which is attached to the manifold 6, the other end of which is attached to the circular plate 37 tends to rotate the shaft 8 in a direction which will close the throttle valve 7. An arm 42 projects from the side of the circular plate 37, and an adjustable set-screw 43 is carried in a threaded hole in the arm 42. A stop 44 is provided on the shelf 29 against which the set-screw 43 abuts to limit the closure of throttle valve 7 when rotated by the spring 41.

Projecting from the side of the web 30 is a boss 45, from which projects a stub shaft 46 whose longitudinal axis is parallel to the axis of rotation of the driving element 34 and 36 of the clutch means 35. A bell crank 47, having arms 48 and 49, rotates on the stub shaft 46 and is retained on the shaft 46 by any suitable means such as the C-shaped ring 46ᵃ which snaps into a groove which extends around the circumference of the stub shaft 46. The arm 48 carries a connecting means 50 for attaching the end of the Bowden wire 27 to the arm 48. This connecting means 50 is rotatable in the arm 48 and provides means such as a set-screw, not shown, which will hold the wire 27 in a position with respect to arm 48 which will best be determined by experiment. A laterally extending arm 51 is provided on the driving element 34 of the clutch means 35. Arms 49 and 51 are maintained in a substantially parallel relationship by the connecting rod 52. This rod is provided with spring-pressed socket devices 53 and 54 at each end which engage ball-shaped portions on the ends of the arms 49 and 51 respectively. This type of connection is well known in the art and no detailed description is necessary.

A source of electric power B is provided to energize the solenoid winding 31. Most conveniently, the usual storage battery of a motor vehicle can be used for this purpose. Two single-pole switches S1 and S2 are connected in series with each other and in series with the battery B and solenoid 31. These switches are referred to, for brevity, as the foot switch and the hand switch, respectively. More explicitly, S1 is actually a foot brake pedal operated control switch. In the preferred form of the invention the hand switch S2 is of the spring-pressed push-button type in which the spring normally urges the switch into a closed position so as to permit electricity to flow in the circuit. The foot switch S1 is preferably mounted so as to be responsive to operation of the brake lever 12.

One satisfactory type of and installation for the foot switch S1 is to have it of the pressure operated type and mounted on the body or frame of the vehicle so that it will be relatively free from vibration. According to such an arrangement, the foot switch S1 is indicated as having a casing 55 provided with laterally extending ears or lugs 56 having openings for the reception of fastening screws or bolts. Within such a casing 55 is a pressure operated switch, the pressure for which is provided by means of a tube 57 connected with the fluid brake pressure system. With the use of a fluid pressure operated switch, the switch is open when the foot pedal 16 is up. However, when the foot brake pedal is actuated and pushed downwardly, fluid pressure is set up through the pipe 57 to the switch S1 and the circuit is closed.

The position for switch S2 may be determined by the manufacturer of the vehicle, but in this disclosure it has been found convenient to locate this switch on the end of the gear shifting lever 58, so that the button 59 may be within close reach for manual operation.

The operation of the device is as follows. During the application of power to the wheels of the vehicle the brake lever 12 and the clutch means 35 will be in the position shown by the solid lines. The position of the throttle valve 7 is controlled by rotation of the foot pedal 16 about the axis of the pin 19. This rotation of the pedal causes a relative movement of the Bowden wire 27 which movement is transmitted to the bell crank 47. The bell crank 47, by means of the connecting rod 52, causes rotation of the driving element 34 of clutch means 35. Rotation of the driving element 34 causes rotation of the driven element 37 which is attached to shaft 8 of throttle valve 7. As long as there is no application of braking force the clutch means 35 will be maintained in engagement by means of spring 39.

When it is desired to apply the brakes, the operator merely pushes down on the foot pedal 16 so as to rotate the brake lever 12 about the axis of shaft 11. At the initiation of this movement the switch S1 is closed by the pressure of fluid in the braking system. Inasmuch as switch S2 is normally maintained in a closed position, the circuit between the power source B and the solenoid winding 33 is closed and the solenoid 31 is energized. Energization of the solenoid 31 causes the solenoid core 32 to move longitudinally, against the pressure of spring 39 so as to disengage the driving element 34 from the driven element 37, as shown by the dotted lines in Fig. 1. When this takes place the spring 41 returns the throttle valve 7 to its closed position to prevent the engine from "racing." In this way, the vehicle may be brought to a stop, and the driver need not be concerned about the position of the foot pedal 16 with respect to rotation about the axis of pin 19.

If the vehicle is brought to a stop while proceeding uphill, and it is necessary to maintain pressure on the brakes, the clutch means 35 can be re-engaged even while this braking pressure is being applied. To do this the driver will manually operate the switch S2 by pressing the button 59 to open the circuit between the solenoid winding 33 and the battery B. The solenoid winding 33, being thus de-energized will permit the spring 39 to cause re-engagement of the driving element 34 with the driven element 37. Because of the beveled surfaces of rib 36 and slot 38 this will be readily accomplished, but in order to avoid "racing" it is advisable for the driver to rotate pedal 16 about the axis of pin 19 until it comes to the normal position for a closed throttle. The mechanical configuration, however, is such that the driven element 37 and the driving element 34 can be readily engaged in only the same normal relative position in which they were when they parted. As the clutch connecting the engine and transmission (not shown) is engaged, the driver may increase the throttle opening by tilting, i. e. rotating the pedal 16, while releasing brake pressure by translational movement of the pedal 16. During this period he will keep the solenoid winding 33 de-energized by pressure on the button 59. When the brake lever 12 is returned to its normal position, as shown by the solid line, the pressure on the switch S1 is relieved and the switch S1 opens. When this takes place the driver need no longer operate switch S2 to enable the clutch means 35 to remain engaged for normal power application by the throttle 7.

Throttle valve operating means for manual adjustment or by regulation by means of instrument board setting is shown in Figure 1. The shaft 8 on which the throttle valve is mounted has, at the end thereof opposite to the solenoid operating means, a lever 9ª extending at right angles to the shaft 8. To this lever 9ª is pivotally connected a link arm 9ᵇ which is connected by suitable means to the hand throttle or dash throttle control as may be desired. The control connections 9ª and 9ᵇ form no part of the present invention but are merely standard equipment.

I claim:

1. In a motor vehicle control device, a throttle valve, a clutch having a driving and driven element, a brake lever, a foot pedal pivotally mounted upon said brake lever, means operatively connecting the driven element of said clutch and said throttle valve, means operatively connecting said foot pedal and the driving element of said clutch so that pivotal movement of said foot pedal will actuate the throttle valve when the clutch is in engagement, resilient means normally urging the clutch into engagement, solenoid means arranged to oppose the resilient means when energized to disengage the clutch, a source of electric power and a switch connected in the circuit with the solenoid, and means enabling said switch to be responsive to application of the vehicle brakes to energize the solenoid to disengage said clutch.

2. In a motor vehicle control device, a throttle valve, a solenoid provided with a rotatable and slidable core, a foot pedal, a brake lever, and a clutch having a driving and a driven element, means operatively connecting the driven element of said clutch and said throttle valve, the driving element of said clutch and the core of said solenoid being formed as a unit, resilient means normally urging said driving element into engagement with the driven element of said clutch, said solenoid arranged to oppose the resilient means when energized to disengage the clutch, said foot pedal being pivotally mounted on said brake lever, means operatively connecting said foot pedal and said driving element so that pivotal movement of the foot pedal will actuate said throttle valve when the clutch is engaged, means including a source of electric power and a switch connected in the circuit with the solenoid, and means enabling said switch to be responsive to application of the vehicle brakes to energize the solenoid to disengage said clutch.

3. In a motor vehicle control device, a throttle valve, a brake lever, a foot pedal pivotally attached to said brake lever, clutch means having a driving and a driven element, means operatively connecting the driven element of said clutch means and said throttle valve, means operatively connecting the driving element of said clutch means and said foot pedal so that pivotal movement of said foot pedal will actuate said throttle valve when the clutch means is engaged, means responsive to application of the vehicle brakes to disengage said clutch means when the brake lever is depressed, and means controlling said responsive means to cause re-engagement of said clutch means while said brakes are applied.

4. In a motor vehicle control device, a throttle valve, a brake lever, a foot pedal pivotally attached to said brake lever, electrical clutch means having a driving and a driven element, means operatively connecting the driven element of said electrical clutch means and said throttle valve, means operatively connecting the driving element of said electrical clutch means and said foot pedal so that pivotal movement of said foot pedal will actuate said throttle valve when the electrical clutch means is engaged, an electric circuit including a source of electric power, a foot switch, and a hand switch connected to said electrical clutch means, and means to position said foot switch so as to be responsive to application of the vehicle brakes to cause disengagement of said electrical clutch means, thereafter said hand switch being operable to cause re-engagement of said electrical clutch means while the vehicle brakes are applied.

5. In a motor vehicle control device, a throttle valve, a brake lever, a foot pedal pivotally mounted upon said brake lever, a clutch having a driving and a driven element, means operatively connecting the driven element of said clutch and said throttle valve, means operatively connecting said foot pedal and the driving element of said clutch so that pivotal movement of said foot pedal will actuate the throttle valve when the clutch is in engagement, resilient means normally urging the clutch into engagement, solenoid means arranged to oppose the resilient means when energized to disengage the clutch, a source of electric power, a foot switch and a hand switch, said foot switch being arranged so as to be responsive to application of the vehicle brakes to energize said solenoid to disengage said clutch, thereafter said hand switch being operable to de-energize said solenoid to permit re-engagement of said clutch while the vehicle brakes are applied.

6. In a motor vehicle control device, a throttle valve, a brake lever, a foot pedal pivotally mounted upon said brake lever, a solenoid provided with a rotatable and slidable core, a clutch having a driving and a driven element, means operatively connecting the driven element of said clutch and said throttle valve, the driving element of said clutch and the core of said solenoid being formed as a unit, resilient means normally urging said driving element into engagment with the driven element of said clutch, said solenoid arranged to oppose the resilient means when energized to disengage the clutch, means operatively connecting said foot pedal and said driving element so that pivotal movement of the foot pedal will actuate said throttle valve when the clutch is engaged, electrical means including a source of electric power, a foot switch, and a hand switch connected to said solenoid, said foot switch being arranged so as to be responsive to application of the vehicle brakes to energize said solenoid to disengage said clutch, thereafter said hand switch being operable to de-energize said solenoid to permit re-engagement of said clutch while the vehicle brakes are applied.

7. In a motor vehicle control device, a throttle valve, a brake lever, a foot pedal pivotally mounted on said brake lever, a solenoid having a rotatable and slidable core, clutch means having a driving and a driven element, the driving element of said clutch means and the core of said solenoid being formed as a unit, a Bowden wire motion transmitting device, one end of said Bowden wire being connected to said brake lever and said foot pedal so that pivotal movement of said foot pedal with respect to said brake lever will transmit motion to the other end of said Bowden wire, means to connect said other end of said Bowden wire to the driving element of said clutch means so as to rotate said driving element, means operatively connecting the driven element of said clutch means and said throttle valve, resilient means normally urging said clutch means into engagement, said solenoid arranged to oppose the resilient means when energized to disengage the clutch, an electric circuit including a source of electricity, a foot switch, and a hand switch connected to said solenoid, said foot switch being arranged so as to be responsive to application of the vehicle brakes to cause said solenoid to be energized to disengage said clutch means, said hand switch thereafter being operable to de-energize said solenoid to permit re-engagement of said clutch means while said brakes are applied.

RICHARD ELDRIDGE WHIFFEN.

REFERENCES CITED

The following references are of record in the file of this patent:

UNITED STATES PATENTS

| Number | Name | Date |
| --- | --- | --- |
| 2,021,832 | Callihan | Nov. 19, 1935 |
| 2,177,305 | Renner | Oct. 24, 1939 |
| 2,183,354 | Lange | Dec. 12, 1939 |
| 2,208,473 | Ross | July 16, 1940 |
| 2,252,009 | Kenny | Aug. 12, 1941 |
| 2,283,478 | Warren | May 19, 1942 |